US006427360B1

(12) United States Patent
Gupté

(10) Patent No.: US 6,427,360 B1
(45) Date of Patent: Aug. 6, 2002

(54) METHOD FOR CONVECTIVELY HEATING PERMEABLE MATERIAL

(75) Inventor: Sunil K. Gupté, Livonia, MI (US)

(73) Assignee: Lear Corporation, Southfield, MI (US)

( * ) Notice: Subject to any disclaimer, the term of this patent is extended or adjusted under 35 U.S.C. 154(b) by 24 days.

(21) Appl. No.: 09/769,865

(22) Filed: Jan. 25, 2001

(51) Int. Cl.$^7$ ............................................... F26B 21/00
(52) U.S. Cl. ........................... 34/633; 34/465; 34/566; 34/655; 34/656; 264/435; 432/194
(58) Field of Search ..................... 264/345; 432/29, 432/179, 194, 196; 34/369, 452, 465, 566, 633, 655, 656

(56) References Cited

U.S. PATENT DOCUMENTS 3,879,858 A * 4/1975 Candor et al. ................ 34/116
5,378,377 A * 1/1995 Graf ............................ 210/787
6,206,350 B1 * 3/2001 Harrison et al. ......... 261/112.2

\* cited by examiner

*Primary Examiner*—Ira S. Lazarus
*Assistant Examiner*—K. B. Rinehart
(74) *Attorney, Agent, or Firm*—Brooks & Kushman P.C.

(57) ABSTRACT

A method for preheating a permeable, thermoformable material having first and second sides includes supplying heated fluid to a fluid distribution system; regulating flow of the fluid such that fluid having a first temperature flows at a first velocity, and fluid having a second temperature less than the first temperature flows at a second velocity greater than the first velocity; introducing the fluid onto the first side of the material; and developing a suction on the second side of the material sufficient to draw the fluid through the material thereby convectively heating the material; wherein the flow of the fluid is regulated so as to transfer substantially uniform energy flux to the material.

13 Claims, 3 Drawing Sheets

METHOD FOR CONVECTIVELY HEATING PERMEABLE MATERIAL

BACKGROUND OF THE INVENTION

1. Field of the Invention

This invention relates to a method for heating a permeable, thermoformable material using heated fluid to convectively heat the material, wherein flow of the fluid is regulated such that relatively cooler portions of the fluid travel more quickly than hotter portions of the fluid.

2. Background Art

A prior method of heating a thermoformable material, including thermoset and thermoplastic materials, involves contact heating. The contact heating method includes placing the material in direct contact with a heat source, such as thermally regulated upper and lower platens. Heat is then transferred principally by conduction from the outer surface to the inner core of the material. Because such materials are typically poor conductors of heat, however, this method requires a significant amount of time to sufficiently heat the materials.

Another method of heating a thermoformable material involves radiant heating. This method involves placing the material near a radiant heat source, such as electric coils or ceramic heaters. The outer portions of the material, however, tend to selectively absorb the radiant energy, and core heating is again accomplished primarily by conduction. Consequently, this method also requires a significant amount of time to sufficiently heat the material.

U.S. Pat. No. 6,036,896, which is assigned to the assignee of the present invention, discloses a method of heating a permeable, thermoformable material using convective heating. The method involves supplying heated fluid to a fluid distribution system and homogenizing the fluid such that the fluid has a substantially uniform velocity and temperature. The method further involves drawing the fluid through the material and passing the fluid through a flow regulating device so as to maintain the homogeneity of the fluid as the fluid exits the material.

SUMMARY OF THE INVENTION

Under the invention, a method for preheating a permeable, thermoformable material having first and second sides includes positioning the material proximate an outlet of a fluid distribution system such that a first section of the material is disposed further away from the outlet than a second section of the material; supplying heated fluid through the outlet; regulating flow of the fluid; introducing the fluid onto the first side of the material; and developing a suction on the second side of the material sufficient to draw the fluid through the material thereby convectively heating the material; wherein the flow of the fluid is regulated such that a first portion of the fluid having a first velocity and a first temperature passes through the first section of the material, and a second portion of the fluid having a second velocity less than the first velocity and a second temperature greater than the first temperature passes through the second section of the material, such that substantially uniform energy flux is transferred from the first and second portions of the fluid to the first and second sections, respectively, of the material.

Advantageously, substantially uniform energy flux may be transferred from the first and second portions of fluid to the first and second sections, respectively, of the material during initial or transient flow conditions, as well as during later steady state flow conditions. As a result, the material may be efficiently and effectively heated without necessarily requiring steady state flow conditions to be reached. Thus, heating cycle times can be reduced.

Further under the invention, a method for preheating a permeable, thermoformable material having first and second sides includes supplying heated fluid to a fluid distribution system; regulating flow of the fluid such that fluid having a first temperature flows at a first velocity, and fluid having a second temperature less than the first temperature flows at a second velocity greater than the first velocity; introducing the fluid onto the first side of the material; and developing a suction on the second side of the material sufficient to draw the fluid through the material thereby convectively heating the material; wherein the flow of the fluid is regulated so as to transfer substantially uniform energy flux to the material.

More specifically, a method for preheating a permeable, thermoformable material having first and second sides includes positioning the material in a housing having a fluid inlet such that a first section of the material is disposed further away from the inlet than a second section of the material; supplying heated fluid to the inlet; passing the fluid through a first flow regulating device having first and second openings such that a first portion of fluid passes through the first opening and a second portion of fluid passes through the second opening, wherein the first opening is disposed further away from the outlet than the second opening, and wherein the first opening is larger than the second opening, such that after passing through the first flow regulating device the first portion of fluid has an average first temperature and an average first velocity, and the second portion of fluid has an average second temperature greater than the average first temperature and an average second velocity less than the average first velocity; passing the fluid through a second flow regulating device disposed downstream of the first flow regulating device so as to homogenize each of the first and second portions of the fluid; introducing the fluid onto the first side of the material; developing a suction on the second side of the material sufficient to draw the fluid through the material such that the first portion of the fluid passes through the first section of the material and the second portion of the fluid passes through the second section of the material, thereby transferring substantially uniform energy flux from the first and second portions of the fluid to the first and second sections, respectively, of the material; and passing the fluid through a third flow regulating device disposed downstream of the material so as to maintain the homogeneity of each of the first and second portions of the fluid.

These and other objects, features and advantages of the invention are readily apparent from the following detailed description of the preferred embodiments for carrying out the invention, when taken in conjunction with the accompanying drawings.

DETAILED DESCRIPTION OF THE PREFERRED EMBODIMENTS

Figure 1:
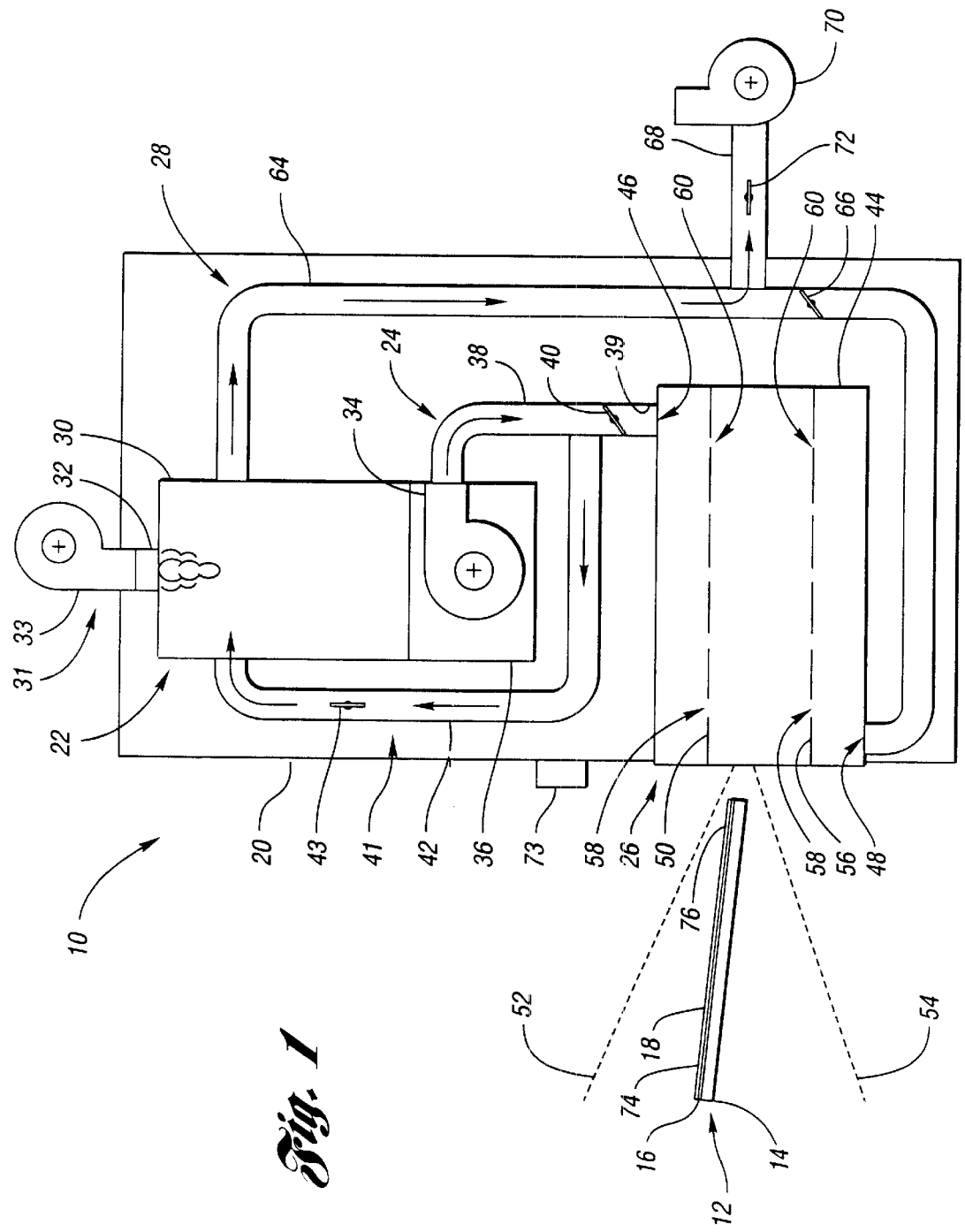
FIG. 1 is a schematic diagram of an apparatus for heating permeable, thermoformable materials according to the invention, wherein dampers of the apparatus are shown properly positioned so as to route heated fluid through a fluid bypass subsystem of the apparatus.

With reference to the drawings, the preferred embodiments of the invention will now be described. FIG. 1 shows a schematic view of an apparatus according to the invention for preheating permeable, thermoformable materials such as a laminate assembly 12. Laminate assembly 12 may include, for example, a formable layer 14, an adhesive layer 16 and a cover member 18. Alternatively, the apparatus 10 may be used to heat any suitable permeable material.

The apparatus 10 comprises an insulated main housing 20, a source of heated fluid such as a burner chamber 22, a fluid distribution system 24 in fluid communication with the burner chamber 22, a processing chamber 26 in fluid communication with the fluid distribution system 24, and a fluid return system 28 connected between the processing chamber 26 and the burner chamber 22 for returning fluid to the burner chamber 22, as explained below in greater detail.

In the embodiment shown in FIG. 1, the burner chamber 22 is disposed in the main housing 20, and includes a burner chamber housing 30 and a burner arrangement 31 for heating air or other fluid in the burner chamber housing 30. The burner arrangement 31 includes a burner 32, which may be any suitable burner such as a natural gas burner or a propane burner. The burner arrangement 31 also includes a combustion blower 33 for providing fresh air, or other fluid, to the burner chamber housing 30. Alternatively, the apparatus 10 may include any suitable source of heated fluid such as a steam source. Furthermore, the apparatus may include multiple sources of heated fluid.

The fluid distribution system 24 is also disposed within the housing 20 and includes a supply blower 34 disposed in a blower chamber 36. The fluid distribution system 24 further includes a supply duct 38 disposed between the blower chamber 36 and the processing chamber 26, and the supply duct 38 has an outlet 39 for supplying heated fluid to the processing chamber 26. A supply damper 40 is disposed in the supply duct 38 for regulating flow of fluid through the supply duct 38. The supply damper 40 is moveable between a closed position, shown in FIG. 1, and a open position shown in FIG. 2.

The fluid distribution system 24 also preferably includes a fluid bypass subsystem 41 for routing fluid back to the burner chamber 22 without releasing the fluid into the processing chamber 26. The fluid bypass subsystem 41 may include, for example, a bypass duct 42 and a bypass damper 43 for regulating flow of fluid through the bypass duct 42. The bypass damper 43 is moveable between an open position shown in FIG. 1, and a closed position shown in FIG. 2.

Alternatively, the fluid distribution system 24 may have any suitable configuration sufficient to route heated fluid to the processing chamber 26, or other location configured to receive the laminate assembly 12.

Figure 2:
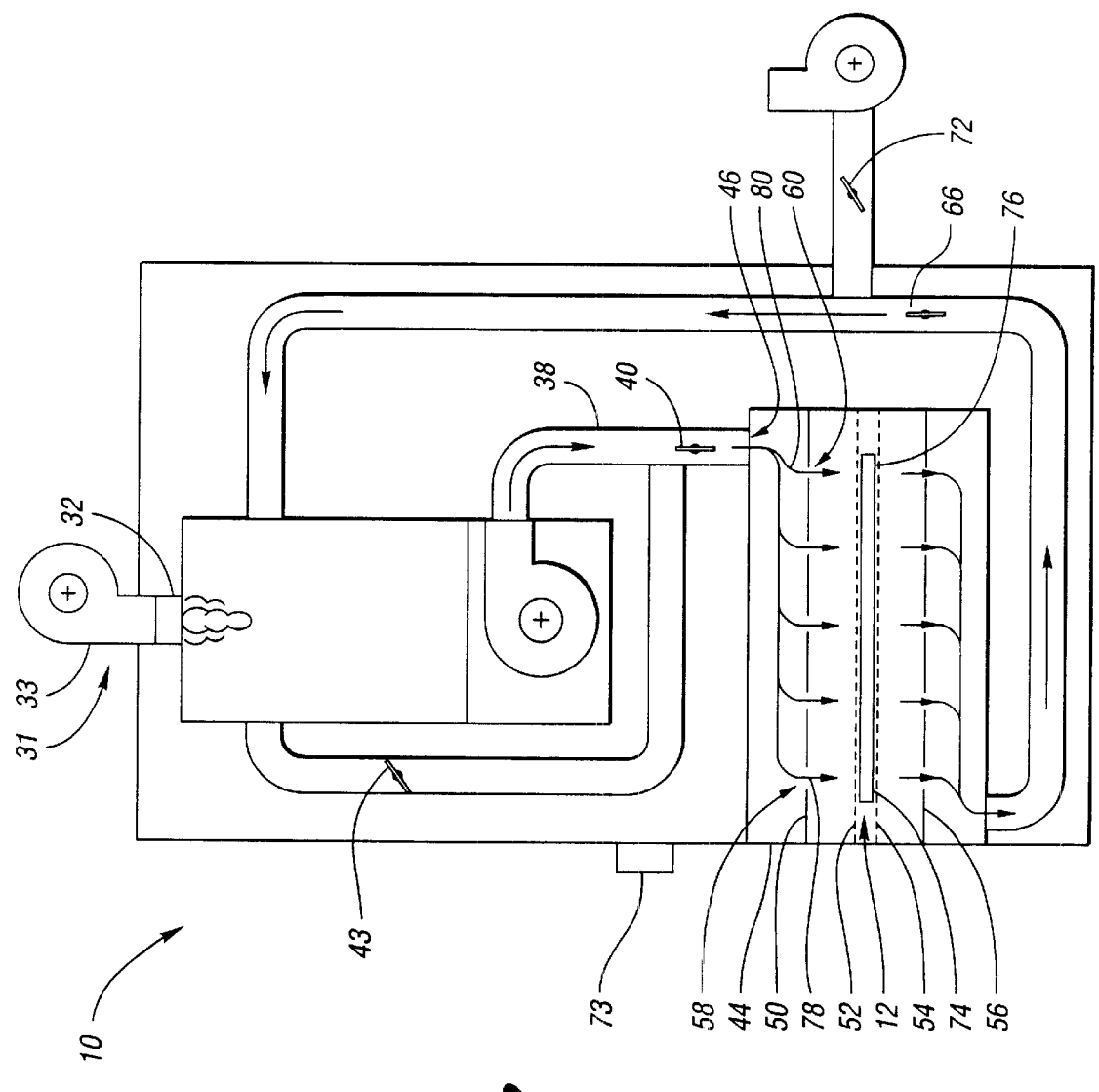
FIG. 2 is a schematic diagram of the apparatus with the dampers properly positioned so as to route heated fluid through a processing chamber of the apparatus.
Figure 3:
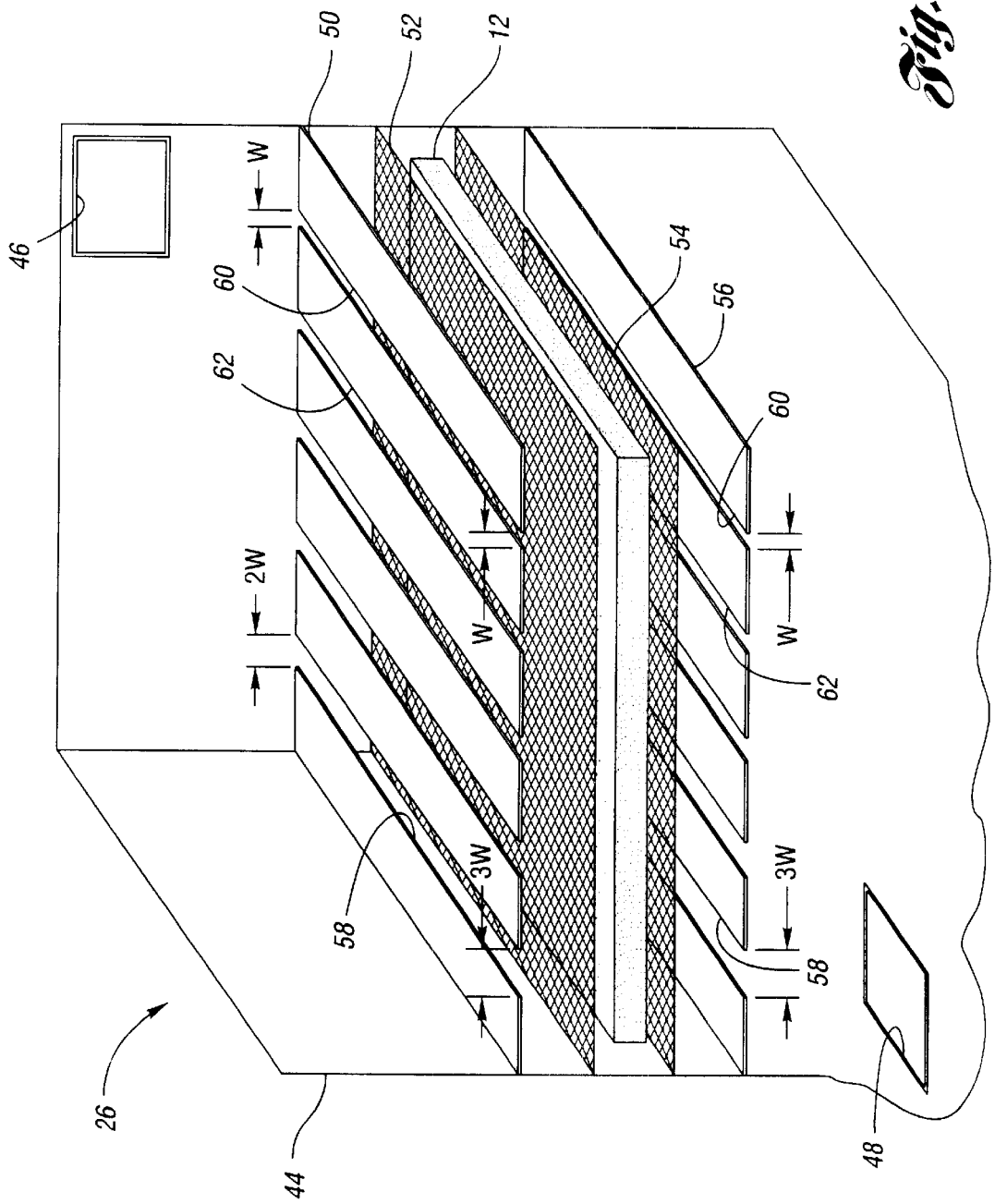
FIG. 3 is a fragmentary perspective view of the processing chamber showing a plurality of flow regulating devices.

Referring to FIGS. 1 through 3, the processing chamber 26 includes a processing chamber housing 44 having an inlet 46 and an outlet 48. The processing chamber 26 also includes one or more flow regulating devices for regulating the flow of fluid as the fluid passes through the processing chamber housing 44, such that relatively cooler portions of the fluid may travel more quickly through the laminate assembly 12 than hotter portions of the fluid. As a result, substantially uniform energy flux, which is proportional to fluid temperature times fluid velocity, may be transferred to substantially all portions of the laminate assembly 12, as explained below in detail. Furthermore, energy flux may be represented as Watts per square meter times time in seconds.

In the embodiment shown in FIGS. 1 through 3, for example, the processing chamber 26 includes first, second, third and fourth flow regulating devices 50, 52, 54 and 56, respectively. The first and fourth flow regulating devices 50 and 56, respectively, preferably include baffle arrangements having a plurality of openings for regulating the flow of fluid. For example, the first and fourth flow regulating devices 50 and 56, respectively, may each include first and second openings 58 and 60, respectively. Each first opening 58 is disposed further away from the inlet 46 than a corresponding second opening 60, and the first openings 58 are generally larger than the second openings 60. As shown in FIG. 3, for instance, the second openings 60 may each have a constant width W, whereas the first openings 58 may each have a width that expands from 2W at one end to 3W at the opposite end.

The first and fourth flow regulating devices 50 and 56 may each also have additional openings 62 disposed between the first and second openings 58 and 60, respectively. The additional openings 62 disposed progressively closer to a particular first opening 58 are preferably progressively larger than the associated second opening 60. However, adjacent additional openings 62 may be the same size. Furthermore, the openings 58, 60 and 62 of the first flow regulating device 50 are preferably, but not necessarily, aligned with the openings 58, 60 and 62 of the fourth flow regulating device 56.

As another example, if the inlet 46 is centrally located on the top of the processing chamber housing 44, the first and fourth flow regulating devices 50 and 56, respectively, may each be provided with one or more relatively small central openings, and a plurality of additional or outer openings that are progressively larger toward the perimeter of each of the first and fourth flow regulating devices 50 and 56, respectively.

The second flow regulating device 52 is preferably configured to mix the fluid so as to homogenize one or more portions of the fluid upstream of the laminate assembly 12, as explained below in greater detail. The third flow regulating device 54 is preferably configured to maintain the homogeneity of the one or more portions of fluid downstream of the laminate assembly 12, as explained below in detail. In one embodiment of the apparatus 10, the second and third flow regulating devices 52 and 54, respectively, each include a mesh, such as a fine wire mesh or a TEFLON® coated fiberglass mesh. Alternatively, the second and third flow regulating devices 52 and 54, respectively, may each include any suitable flow regulating device, such as a perforated sheet or panel.

The second and third flow regulating devices 52 and 54, respectively, may also function as retaining members for retaining the laminate assembly 12 within the processing chamber 26. For example, the second and third flow regulating devices 52 and 54, respectively, may be slidably mounted to the processing chamber housing 44 so that the second and third flow regulating devices 52 and 54, respectively, may be removed partially or fully from the processing chamber housing 44, and separated so as to receive the laminate assembly 12 therebetween. As another example, the second and third flow regulating devices 52 and 54, respectively, may each be configured as a conveyor belt for automatically loading and unloading the laminate assembly 12, or other material, in the processing chamber 26. Alternatively, the apparatus 10 may be provided with any suitable member or members for retaining the laminate assembly 12 within the processing chamber 26. Furthermore, the second and third flow regulating devices 52 and 54, respectively, may be positioned in the processing chamber housing 44 such that the second and third flow regulating devices 52 and 54, respectively, are spaced away from the laminate assembly 12 when the laminate assembly 12 is positioned in the processing chamber housing 44.

Advantageously, all of the flow regulating devices 50–56 may be removably mounted within or to the processing chamber housing 44, so that each of the flow regulating devices 50–56 can be modified, eliminated or replaced with another component depending on the application.

Referring to FIG. 2, the fluid return system 28 includes a return duct 64 that collects fluid from the processing chamber 26 and routes the fluid back to the burner chamber 22. With such a configuration, the supply blower 34 is able to reduce pressure within the return duct 64 relative to the pressure in the supply duct 38. For example, the supply blower 34 may achieve a gauge pressure within the return duct 64 of about 0 to −5 pounds per square inch (psi) or 0 to −3.446×10$^4$ Pascal, and a gauge pressure in the supply duct 38 of about 0 to 5 psi (0 to 3.446×10$^4$ Pascal). As a result, a pressure gradient of about 0 to 10 psi (0 to 6.892×10$^4$ Pascal) may be developed across the laminate assembly 12 for drawing fluid through the laminate assembly 12.

The fluid return system 28 also includes a return damper 66 disposed in the return duct 64 for regulating flow through the return duct 64. The return damper 66 is moveable between an closed position shown in FIG. 1, and an open position shown in FIG. 2.

The fluid return system 28 may also include an exhaust duct 68 connected to an exhaust blower 70 for removing fluid from the apparatus 10. Furthermore, an exhaust damper 72 is disposed in the exhaust duct 68 for regulating flow of fluid through the exhaust duct 68. The exhaust damper 72 is moveable between an open position shown in FIG. 1 and a closed position (not shown).

The apparatus 10 may also include a control system 73 that controls operation of the burner 32, blowers 33, 34 and 70, and dampers 40, 43, 66 and 72. The control system 73 may also control fluid temperature in the processing chamber 26 by periodically monitoring the fluid temperature, and regulating the amount of energy, such as fuel, provided to the burner 32 in order to achieve a desired temperature.

Referring to FIGS. 1 through 3, a method according to the invention for heating a permeable material, such as the laminate assembly 12, will now be described. First, the blowers 33, 34 and 70 are activated with the supply damper 40 in the open position, the bypass damper 43 in the closed position or partially open, the return damper 66 in the open position and the exhaust damper 72 in the open position, so as to purge combustible vapors, if any, from the apparatus 10. During the purge cycle, proper air flow through the ducts 38, 42, 64 and 68 may also be confirmed. At the end of the purge cycle, the burner 32 is activated to establish a pilot flame. After the pilot flame is confirmed as being stable, such as by viewing the pilot flame through a looking glass, the burner 32 establishes a process capable flame so as to heat fluid, such as air, in the burner chamber 22.

Next, a process temperature is selected using the control system 73. Operation of the apparatus 10 is then continued so as to achieve the process temperature at least momentarily in the processing chamber 26. Next, referring to FIG. 1, the supply damper 40 is moved to the closed position, the bypass damper 43 is moved to the open position and the return damper 66 is moved to the closed position, so as to route heated air through the fluid bypass subsystem 41. The laminate assembly 12 may then be positioned between the second and third flow regulating devices 52 and 54, respectively, and within the processing chamber housing 44 such that a first section 74 of the laminate assembly 12 is disposed further away from the outlet 39 than a second section 76 of the laminate assembly 12.

The formable layer 14 of the laminate assembly 12 may be any permeable material that is thermoformable when sufficiently heated. Such materials include thermoformable rigid urethane (TRU) and polyethylene terephthalate (PET), with fibrous, non-woven PET being the preferred material for headliner applications. The adhesive layer 16 may comprise any permeable thermosetting or thermoplastic adhesive. The cover member 18 preferably comprises non-woven PET for headliner applications, but it may comprise any suitable permeable cover material such as cloth or carpet. Alternatively, the cover member 18 and/or the adhesive layer 16 may be eliminated if not required for a particular application. Furthermore, multiple formable layers 14 and/or adhesive layers 16 may be utilized depending on the application.

Next, referring to FIG. 2, the supply damper 40 is moved to the open position, the bypass damper 43 is moved to the closed position and the return damper 66 is moved to the open position, so as to route heated air through the supply duct 38. The heated air then passes from the outlet 39 through the inlet 46 of the processing chamber housing 44. At the inlet 46, the heated air may have a temperature in the range of, for example, 240 to 260° C. Next, the heated air passes through the first flow regulating device 50.

Still referring to FIG. 2, a first portion of air traveling along a first flow line 78, from the outlet 39 to the first opening 58, must travel further than a second portion of air traveling along a second flow line 80, from the outlet 39 to the second opening 60. As a result, the first portion of air will likely be cooler than the second portion of air at the first flow regulating device 50. For example, the first portion of air may have an average first temperature in the range of about 180 to 190° C., while the second portion of air may have an average second temperature in the range of about 200 to 210° C. It is to be understood that average temperatures may vary depending on such factors as desired process temperature, size of processing chamber 26, and relative positions of the outlet 39 and the first flow regulating device 50.

Advantageously, because of the relative sizes of the first and second openings 58 and 60, respectively, the first flow regulating device 50 provides minimum flow resistance to the first portion of air, while providing somewhat greater flow resistance to the second portion of air. Consequently, after passing through the first flow regulating device 50, the average velocity of the first portion of air is preferably greater than the average velocity of the second portion of air. For example, the first portion of air may have an average first velocity in the range of 0.28 to 0.30 meters per second, while the second portion of air may have an average second velocity in the range of 0.24 to 0.26 meters per second. Alternatively, the first flow regulating device 50, as well as other components of the apparatus 10, may be configured to achieve any suitable flow velocities.

The first flow regulating device 50 is also preferably configured to regulate flow of additional portions of air that pass through the additional openings 62, such that additional portions of air that pass through additional openings 62 disposed progressively further away from the second opening 60 will have progressively greater average velocities than the second portion of air. Furthermore, the first flow regulating device 50 is preferably provided with a sufficient number of additional openings 62 such that changes in velocity may occur gradually along a transverse plane downstream of the first flow regulating device 50. Moreover, additional portions of air that pass through adjacent additional openings 62 may have the same average velocity downstream of the first flow regulating device 50.

Next, the heated air passes through the second flow regulating device 52, which homogenizes each portion of the heated air so as to reduce temperature and velocity variations within each portion of air. The second flow regulating device 52 also induces mixing of adjacent portions of air such that changes in temperature and velocity may occur gradually along a transverse plane downstream of the second flow regulating device 52. The heated air is then drawn through the laminate assembly 12 so as to heat the laminate assembly 12. The third and fourth flow regulating devices 54 and 56, respectively, preferably maintain the homogeneity of each portion of the heated air as the heated air exits the laminate assembly 12, in order to ensure optimum air flow through the entire laminate assembly 12.

Advantageously, the method and apparatus 10 of the invention enable uniform energy flux to be transferred from the heated air, or other heated fluid, to the laminate assembly 12. More specifically, the flow regulating devices 50-56 are configured to regulate flow velocity, as described above, so that the first and second portions of air may respectively transfer substantially the same energy flux to the first and second sections 74 and 76, respectively, of the laminate assembly 12. Similarly, the flow regulating devices 50–56 are configured to regulate flow velocity such that the additional portions of air traveling between the first and second portions of air may each transfer substantially the same energy flux to a particular additional section of the laminate assembly 12. As a result, substantially uniform energy flux may be transferred from the air to the laminate assembly 12.

Furthermore, each portion of air, including each additional portion of air, preferably delivers substantially uniform energy flux to a particular section of the laminate assembly 12 during initial or transient flow conditions, as well as during later steady state flow conditions. As a result, the laminate assembly 12 may be efficiently and effectively heated without necessarily requiring steady state flow conditions to be reached. Thus, heating cycle times can be reduced. Alternatively, heating of the laminate assembly 12 may continue during steady state flow conditions.

Once sufficiently heated, the laminate assembly 12 may then be thermoformed in any suitable manner. For example, the laminate assembly 12 may be positioned between two or more mold sections, and the mold sections may be forced together so as to form a part, such as a headliner, floor carpet system, or package tray for a motor vehicle.

Under the method of the invention, a relatively large piece of material, such as a piece of material to be used as a headliner for a motor vehicle, may be efficiently and effectively heated to a substantially uniform temperature. Furthermore, because the method involves selectively regulating velocity of the heated air or other heated fluid, the method may be practiced using a single heated fluid source and without requiring expensive manifold arrangements to distribute fluid over large areas. However, such manifold arrangements may be used if desired.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for preheating a permeable, thermoformable material having first and second sides, the method comprising:
    positioning the material proximate an outlet of a fluid distribution system such that a first section of the material is disposed further away from the outlet than a second section of the material;
    supplying heated fluid through the outlet;
    regulating flow of the fluid;
    introducing the fluid onto the first side of the material; and
    developing a suction on the second side of the material sufficient to draw the fluid through the material thereby convectively heating the material;
    wherein the flow of the fluid is regulated such that a first portion of the fluid having a first velocity and a first temperature passes through the first section of the material, and a second portion of the fluid having a second velocity less than the first velocity and a second temperature greater than the first temperature passes through the second section of the material, such that substantially uniform energy flux is transferred from the first and second portions of the fluid to the first and second sections, respectively, of the material.

2. The method of claim 1 wherein regulating flow of the fluid comprises passing the fluid through a first flow regulating device having first and second openings, wherein the first opening is disposed further away from the outlet than the second opening, and wherein the first opening is larger than the second opening.

3. The method of claim 2 wherein the first flow regulating device includes a baffle arrangement.

4. The method of claim 2 wherein regulating flow of the fluid further comprises passing the fluid through a second flow regulating device disposed downstream of the first flow regulating device so as to homogenize the first and second portions of the fluid prior to the first and second portions of the fluid passing through the first and second sections, respectively, of the material.

5. The method of claim 4 wherein the second flow regulating device includes a mesh.

6. The method of claim 4 wherein the second flow regulating device includes a fiberglass mesh.

7. The method of claim 4 further comprising passing the fluid through a third flow regulating device after the fluid has been drawn through the material to maintain the homogeneity of the first and second portions of the fluid as the first and second portions of the fluid exit the material.

8. The method of claim 7 wherein the third flow regulating device includes a mesh.

9. The method of claim 7 wherein the third flow regulating device includes a fiberglass mesh.

10. The method of claim 7 further comprising passing the fluid through a fourth flow regulating device disposed downstream of the third flow regulating device and having first and second openings, wherein the first opening of the fourth flow regulating is disposed further away from the outlet than the second opening of the fourth flow regulating device, and wherein the first opening of the fourth flow regulating device is larger than the second opening of the fourth flow regulating device.

11. The method of claim 10 wherein the first opening of the fourth flow regulating device is aligned with the first opening of the first flow regulating device, and wherein the second opening of the fourth flow regulating device is aligned with the second opening of the first flow regulating device.

12. A method for preheating a permeable, thermoformable material having first and second sides, the method comprising:
- supplying heated fluid to a fluid distribution system;
- regulating flow of the fluid such that fluid having a first temperature flows at a first velocity, and fluid having a second temperature less than the first temperature flows at a second velocity greater than the first velocity;
- introducing the fluid onto the first side of the material; and
- developing a suction on the second side of the material sufficient to draw the fluid through the material thereby convectively heating the material;
- wherein the flow of the fluid is regulated so as to transfer substantially uniform energy flux to the material.

13. A method for preheating a permeable, thermoformable material having first and second sides, the method comprising:
- positioning the material in a housing having a fluid inlet such that a first section of the material is disposed further away from the inlet than a second section of the material;
- supplying heated fluid to the inlet;
- passing the fluid through a first flow regulating device having first and second openings such that a first portion of fluid passes through the first opening and a second portion of fluid passes through the second opening, wherein the first opening is disposed further away from the outlet than the second opening, and wherein the first opening is larger than the second opening, such that after passing through the first flow regulating device the first portion of fluid has an average first temperature and an average first velocity, and the second portion of fluid has an average second temperature greater than the average first temperature and an average second velocity less than the average first velocity;
- passing the fluid through a second flow regulating device disposed downstream of the first flow regulating device so as to homogenize each of the first and second portions of the fluid;
- introducing the fluid onto the first side of the material;
- developing a suction on the second side of the material sufficient to draw the fluid through the material such that the first portion of the fluid passes through the first section of the material and the second portion of the fluid passes through the second section of the material, thereby transferring substantially uniform energy flux from the first and second portions of the fluid to the first and second sections, respectively, of the material; and
- passing the fluid through a third flow regulating device disposed downstream of the material so as to maintain the homogeneity of each of the first and second portions of the fluid.

* * * * *